United States Patent
Becker

(10) Patent No.: US 7,780,394 B1
(45) Date of Patent: Aug. 24, 2010

(54) SYNCHRONIZED ROTATIVE LIFT PLATFORM FOR VEHICLE HITCH RECEIVERS

(76) Inventor: Shane Becker, 4097 Wren Rd., Thomasville, PA (US) 17364

( * ) Notice: Subject to any disclaimer, the term of this patent is extended or adjusted under 35 U.S.C. 154(b) by 1051 days.

(21) Appl. No.: 11/480,748

(22) Filed: Jul. 3, 2006

(51) Int. Cl.
*B60P 9/00* (2006.01)

(52) U.S. Cl. .................. 414/462; 414/467; 414/495; 414/546; 414/567; 224/509

(58) Field of Classification Search .............. 414/495, 414/546, 562, 567, 467, 462; 224/509
See application file for complete search history.

(56) References Cited

U.S. PATENT DOCUMENTS

| | | | |
|---|---|---|---|
| 1,573,172 A * | 2/1926 | Laffey | 414/349 |
| 2,536,954 A * | 1/1951 | Olsen | 254/91 |
| 2,949,198 A * | 8/1960 | Abbott | 414/546 |
| 3,233,758 A | 2/1966 | Darfus | |
| 3,913,811 A | 10/1975 | Spencer | |
| 3,968,890 A | 7/1976 | Robson | |
| 4,407,624 A * | 10/1983 | Kingston | 414/546 |
| 4,635,883 A * | 1/1987 | Hamilton et al. | 244/137.1 |
| 4,787,809 A | 11/1988 | Zrostlik | |
| 4,940,096 A * | 7/1990 | Johnson | 172/443 |
| 5,445,300 A * | 8/1995 | Eipper et al. | 224/496 |
| 5,456,564 A * | 10/1995 | Bianchini | 414/462 |
| 6,102,647 A * | 8/2000 | Yap | 414/539 |
| 6,164,895 A | 12/2000 | Croswell | |
| 6,254,117 B1 | 7/2001 | Cross | |
| 6,461,095 B1 | 10/2002 | Puska | |
| 6,638,000 B2 * | 10/2003 | Groves | 414/462 |
| 6,869,265 B2 * | 3/2005 | Smith et al. | 414/462 |
| 6,983,979 B2 * | 1/2006 | Rasmussen | 296/156 |
| 7,281,646 B2 * | 10/2007 | Flannery | 224/509 |

FOREIGN PATENT DOCUMENTS

| | | |
|---|---|---|
| CA | 2385101 | 11/2002 |
| CA | 2452740 | 9/2004 |
| WO | WO2005/026455 | 3/2005 |

* cited by examiner

*Primary Examiner*—Michael S Lowe
(74) *Attorney, Agent, or Firm*—Michael I Kroll

(57) ABSTRACT

The present invention overcomes the shortcomings of the prior art by providing a rotative platform powered manually through a hand crank or motor connected to a worm gear as the system motive force. Each of the arm bar lift is connected to a worm screw shaft providing synchronization as each arm bar rotates from the load position to the travel position. The device can rotate 360 degrees keeping a level platform through its entire rotation. This level platform rotation can only be achieved by having both arm bars connected and kept in time with each other with the worm gears and worm screw.

4 Claims, 8 Drawing Sheets

SYNCHRONIZED ROTATIVE LIFT PLATFORM FOR VEHICLE HITCH RECEIVERS

BACKGROUND OF THE INVENTION

1. Field of the Invention

The present invention relates generally to lifts and, more specifically to a rotative platform powered manually through a hand crank or motor connected to a worm gear as the system motive force. Each of the arm bar lift is connected to a worm screw shaft providing synchronization as each arm bar rotates from the load position to the travel position. The device can rotate 360 degrees keeping a level platform through its entire rotation. This level platform rotation can only be achieved by having both arm bars connected and kept in time with each other with the worm gears and worm screw.

2. Description of the Prior Art

There are other lifting devices designed for motor vehicles. Typical of these is U.S. Pat. No. 3,233,758 issued to Darfus on Feb. 8, 1966.

Another patent was issued to Spencer on Oct. 21, 1975 as U.S. Pat. No. 3,913,811. Yet another U.S. Pat. No. 3,968,890 was issued to Robson on Jul. 13, 1976 and still yet another was issued on Nov. 29, 1988 to Zrostlik as U.S. Pat. No. 4,787,809.

Another patent was issued to 4,940,096 on Jul. 10, 1990 as U.S. Pat. No. 4,940,096. Yet another U.S. Pat. No. 5,456,564 was issued to Bianchini on Oct. 10, 1995. Another was issued to Croswell on Dec. 26, 2000 as U.S. Pat. No. 6,164,895 and still yet another was issued on Jul. 3, 2001 to Cross as U.S. Pat. No. 6,254,117.

Another patent was issued to Puska on Oct. 8, 2002 as U.S. Pat. No. 6,461,095. Yet another Canadian Patent No. CA 2385101 was issued to Gatheridge on Nov. 4, 2004. Another was issued to Tzortzinis on Sep. 14, 2004 as Canadian Patent No. CA 2452740 and still yet another was issued on Mar. 24, 2005 to Carrithers as International Patent Application No. WO 2005/026455.

U.S. Pat. No. 3,233,758

Inventor: John M. Darfus

Issued: Feb. 8, 1966

A lift gate for a cargo-carrying vehicle comprising a base frame structure detachably mountable on the vehicle, said base frame structure including a base member releasably engageable with the floor of the vehicle's cargocarrying space and a pair of upstanding struts secured to said base member in relatively spaced relationship, each of said struts having means releasably engageable with said vehicle to maintain said struts in an upright position, a cargo-supporting platform, a mechanical linkage interconnecting said base frame structure with said cargo supporting platform and being operable to effect vertical displacement of said platform relative to said frame structure between a load-transferring position relative to the vehicle and a second load-transferring position and alternatively to position said platform within the space defined by said base frame structure, and actuating means operatively connected between said linkage mechanism and said base frame structure and being selectively operable to actuate said linkage.

U.S. Pat. No. 3,913,811

Inventor: Jimmy J. Spencer

Issued: Oct. 21, 1975

A foldable utility platform with means for securing the same in horizontal carrying position, and in upright stored position, for attachment to a standard carrier trailer hitch.

U.S. Pat. No. 3,968,890

Inventor: Robert Robson

Issued: Jul. 13, 1976

There are disclosed two forms of load lifting and lowering unit for attachment to a vehicle. The units are of the kind in which a load platform is carried between two parallel spaced-apart articulated parallelogram linkages, movable in unison up and down guide members spaced across an access opening of the vehicle to raise and lower a load to and from the access opening. An inextensible tie member, pivotally connected between the platform and a swinging arm of the parallelogram linkage, causes the platform automatically to close off the access opening when the linkages are folded towards the vehicle. In one embodiment, the swinging arm cooperates with a fixed stop during upward movement of the linkages to effect such closure: in the other embodiment, a fluid operated ram swings the platform upwardly about its pivot to fold the linkages towards the vehicle and cause the platform to close off the access opening.

U.S. Pat. No. 4,787,809

Inventor: Francis L. Zrostlik

Issued: Nov. 29, 1988

A lift gate assembly including a U-shaped base having horizontal central section flanked by parallel upstanding legs, a gate, and a pair of upstanding legs secured to the gate in alignment with the legs and the base. Links extending between the legs define two parallelogram linkages and a torsion bar extends between and is rigidly attached to a corresponding link in each of the parallelogram linkages. Preferably, the torsion bar defines the lower pivot of the parallelogram linkage and extends between the legs of the base and the lowermost links in each parallelogram linkage, being rigidly attached thereto. Hydraulic cylinders are provided for each parallelogram linkage to raise and lower the gate.

U.S. Pat. No. 4,940,096

Inventor: Jerry A. Johnson

Issued: Jul. 10, 1990

A three point hitch mounted on the rear of a pick up truck has a pair of lift draft arms connected to a hay bale carrier.

Pivot connections having upright pivot pins attach the lift draft arms to a transverse shaft allowing the lift draft arms to be folded adjacent each other below the rear bumper of the truck. Crank arms secured to opposite end of the shaft are connected to hydraulic piston and cylinder assemblies. The piston and cylinder assemblies are operable to rotate the shaft to selectively raise and lower the lift draft arms and bale carrier mounted thereon.

U.S. Pat. No. 5,456,564

Inventor: Thomas R. Bianchini

Issued: Oct. 10, 1995

A new and improved winch operated vehicle mounted carrier comprised of an upper rectangular section having a securement bar extending inwardly therefrom. The securement bar is received within a class 3 trailer hitch for securement of the upper rectangular section thereto. An electric winch is secured to the upper rectangular section. The electric winch has a drive cable there secured. The drive cable has a securement portion extending downwardly therefrom. The invention includes two pairs of arms. Each of the two pairs of arms is pivotally secured to a lower portion of the upper rectangular section. A lower support bracket is pivotally secured to an opposing end of the two pairs of arms. A latch is secured to a middle portion of the lower support bracket. The latch couples with the securement portion of the drive cable of the electric winch. A lower support tray is secured across the lower support bracket. Two spring-loaded catches are secured to an outer portion of the upper rectangular section. The catches engage the outwardly extending tabs of the arms in a locked position when the electric winch pulls the lower support bracket to a position adjacent the upper rectangular section.

U.S. Pat. No. 6,164,895

Inventor: Edward M. Croswell

Issued: Dec. 26, 2000

A lifting attachment is disclosed for use in conjunction with a trailer hitch mounted to a vehicle. The lifting attachment includes a support assembly which is detachably connected to the trailer hitch and this support assembly includes a vertically extending support beam. The attachment includes a platform having a generally planar top and an elongated arm having one end pivotally connected to the platform and a second end pivotally connected to the support beam. A hydraulic piston and cylinder assembly is pivotally connected between the support beam and an intermediate point on the arm so that extension and retraction of the piston within the cylinder selectively raises and lowers the platform.

U.S. Pat. No. 6,254,117

Inventor: Gary Cross

Issued: Jul. 3, 2001

A folding trailer is described including a wheeled first frame portion having a tongue secured thereto which extends forwardly therefrom for connection to a hitch adapter which is mounted on the hitch of the an all-terrain vehicle. A second frame portion is pivotally secured to the rearward end of the wheeled frame portion and a rear frame portion is pivotally secured to the rearward end of the second frame portion in such a manner that it may be pivotally moved upwardly from a horizontally disposed position on the rearward end of the second frame portion to an upwardly extending position. The rear frame portion may be folded onto the second frame portion with those frame portions being folded upon the wheeled frame portion. The trailer may then be pivotally moved upwardly and secured to the rack of the all-terrain vehicle.

U.S. Pat. No. 6,461,095

Inventor: David P. Puska

Issued: Oct. 8, 2002

An ATV lift and carry apparatus for lifting heavy objects upon the rack member mounted to an ATV. The ATV lift and carry apparatus includes a main support assembly being adapted to be securely attached to an ATV; and also includes a hitch mounting member being adapted to adjustably attach to a hitch of the ATV; and further includes a rack support member being pivotally mounted to the hitch mounting member; and also includes a rack member being pivotally attached to the rack support member and being adapted to be supported upon the ATV; and further includes a lift assembly for lifting objects upon the rack member.

Canadian Patent Number CA2,385,101

Inventor: Ronald D. Gatheridge

Issued: Nov. 11, 2002

The present invention relates to a light utility lift for attaching to a front of a vehicle having a winch and a winch cable and also a rear axle and a vehicle frame. An upright rectangular frame is mounted to the front of the vehicle, with the frame including a pair of opposed side rails. A movable carriage assembly is positioned between the side rails and is movable along the side rails in an up and down direction. A lifting attachment may be mounted to the carriage. The winch cable is connected to the carriage for pulling the carriage upwardly when the winch is operated in one direction and lowering the carriage when operating in a different direction. A restraint device is connected between the rear axle and the vehicle frame causing the weight of the vehicle to act as a counter balance to the weight carried by the carriage.

Canadian Patent Number CA 2,452,740

Inventor: Nick Tzortzinis

Issued: Sep. 14, 2004

A three point hitch for a cart-type utility vehicle wherein the utility vehicle comprises a vehicle frame that includes an axle housing and an upper frame cross member. The three point hitch comprises a pair of spaced apart tower draft links, each pivotally mounted to the axle housing and extending rearward, the lower draft links having connection features at free ends thereof for connecting to an implement. A beam extends in a lateral direction parallel to the upper frame cross member. A rockshaft extends parallel to the beam and is pivotally connected to the beam. A lift bracket is fixedly connected to the rockshaft. Two upper links are fixedly connected to the rockshaft and extend rearward, the upper links located above the lower draft links. Two vertical links connect the upper links and the lower draft links. Endplates are fixedly connected to the beam and are connected to the vehicle frame by pins that also are used to pivotally connect a cargo box or platform to the frame. A bracket assembly is configured to capture the upper frame cross member and brace against the beam. The bracket assembly extends to a cylinder connection below the rockshaft. A hydraulic cylinder is connected between the cylinder connection and the lift bracket. Expansion of the hydraulic cylinder rotates the rockshaft to lift the lower draft links.

International Patent Application Number
WO2005/0264 55

Inventor: Barry K. Elliott

Published: Mar. 24, 2005

A hitch and adapter assembly for connecting an implement to the front end of vehicles such as all terrain vehicle providing a rigid connection with limited motion for reduced vibration operation. The hitch has two spaced apart sockets on a rigid frame that pivotally connects to the vehicle providing a rigid extension thereof. The sockets receive and cooperatively engage respective pins on the implement providing a quick connection. An electrically powered hydraulic cylinder is connected at one end to the frame and the other end connects to the vehicle by a coupler that slip fits into a socket therefore on the vehicle. The frame pivotally connects to the vehicle at two spaced apart positions. There is a coarse and fine adjustment for varying the height and tilt positions of the implement.

While these lift mechanisms may be suitable for the purposes for which they were designed, they would not be as suitable for the purposes of the present invention, as hereinafter described.

SUMMARY OF THE PRESENT INVENTION

A primary object of the present invention is to provide a lift mechanism for a motorized vehicle utilizing the vehicle hitch receiver.

Another object of the present invention is to provide a lift mechanism having a beam arm insertable into a motor vehicle hitch receiver.

Yet another object of the present invention is to provide a transversally positioned support member across said beam arm.

Still yet another object of the present invention is to provide a drive synchronization for a pair of depending arms.

Another object of the present invention is to provide said depending arms with gear means engaging the synchronization means.

Yet another object of the present invention is to provide a lift mechanism having hand powered means or motorized means for engaging the drive synchronization means.

Still yet another object of the present invention is to provide a platform free-wheelingly mounted to the depending arms whereby movement of the synchronized arms provides a horizontal plane for the platform.

Additional objects of the present invention will appear as the description proceeds.

The present invention overcomes the shortcomings of the prior art by providing a rotative platform powered manually through a hand crank or motor connected to a worm gear as the system motive force. Each of the arm bar lift is connected to a worm screw shaft providing synchronization as each arm bar rotates from the load position to the travel position. The device can rotate 360 degrees keeping a level platform through its entire rotation. This level platform rotation can only be achieved by having both arm bars connected and kept in time with each other with the worm gears and worm screw.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
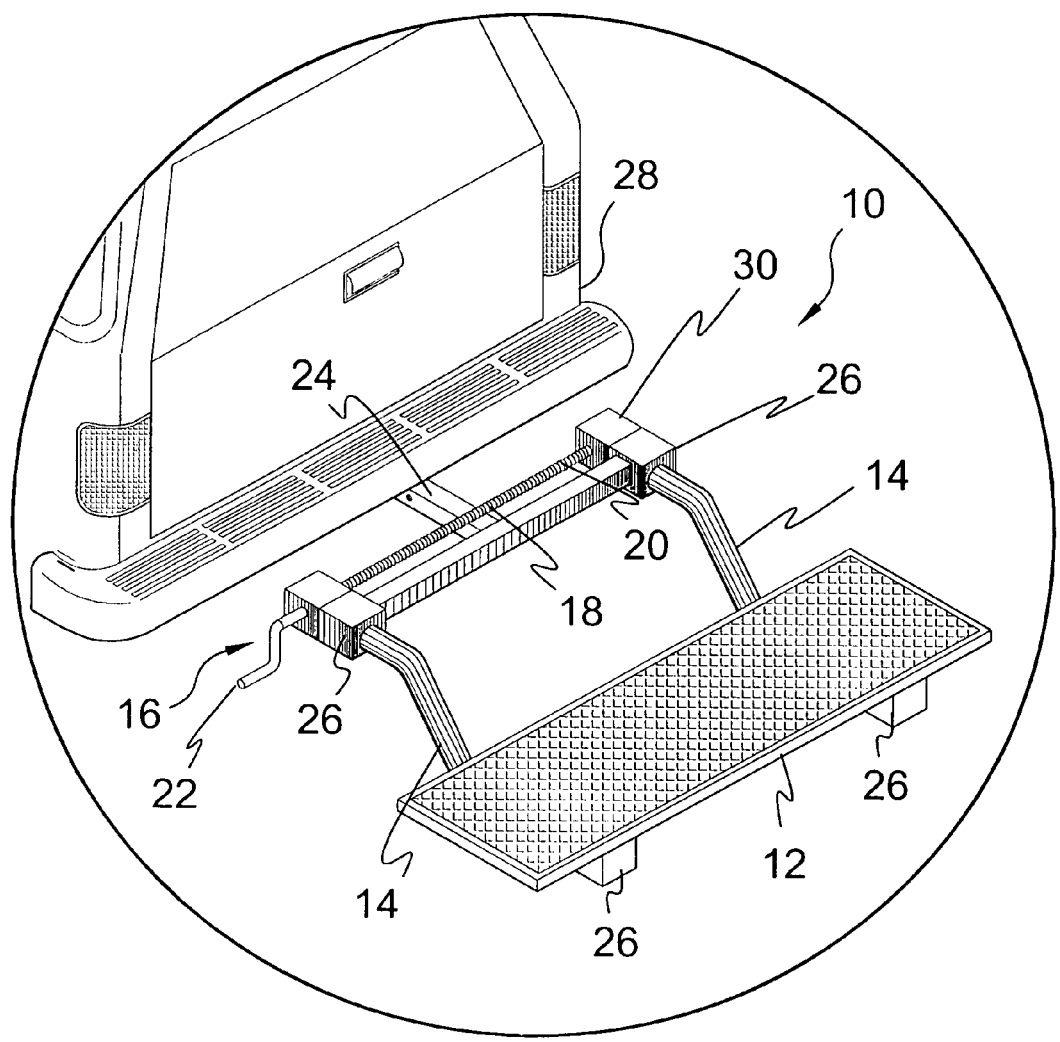
FIG. 1 is a perspective view of the present invention.

Turning now descriptively to the drawings, in which similar reference characters denote similar elements throughout the several views, the figures illustrate the Synchronized Rotative Lift Apparatus for Receiving a Vehicle Hitch of the present invention. With regard to the reference numerals used, the following numbering is used throughout the various drawing figures.

10 Synchronized Rotative Lift Apparatus for Receiving a Vehicle Hitch
12 lift platform
14 arm bar lift
16 lift assembly
18 worm screw shaft
20 primary worm gear
22 crank handle
24 hitch receiver
26 pillow block bearing
28 vehicle
30 worm gear of 14
32 timing wheel
34 timing belt

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a perspective view of the present invention 10. Illustrated is a hand crank 22 connected to the primary worm gear 20 as the system motive force. Each arm bar lift 14 is connected to a worm screw shaft 18 providing synchronization as the arm bar lifts 14 rotate the lift platform 12 from the lowered load position to the raised travel position. The device can rotate 360 degrees keeping a level platform 12 through its entire rotation. This level platform 12 rotation can only be achieved by having both arm bars 14 connected to pillow block bearings 26 and kept in time with each other with the worm gears 30 and worm screw shaft 18. The lift assembly 16 further includes a receiver 24 for mounting to the hitch of a motor vehicle 28.

Figure 2:
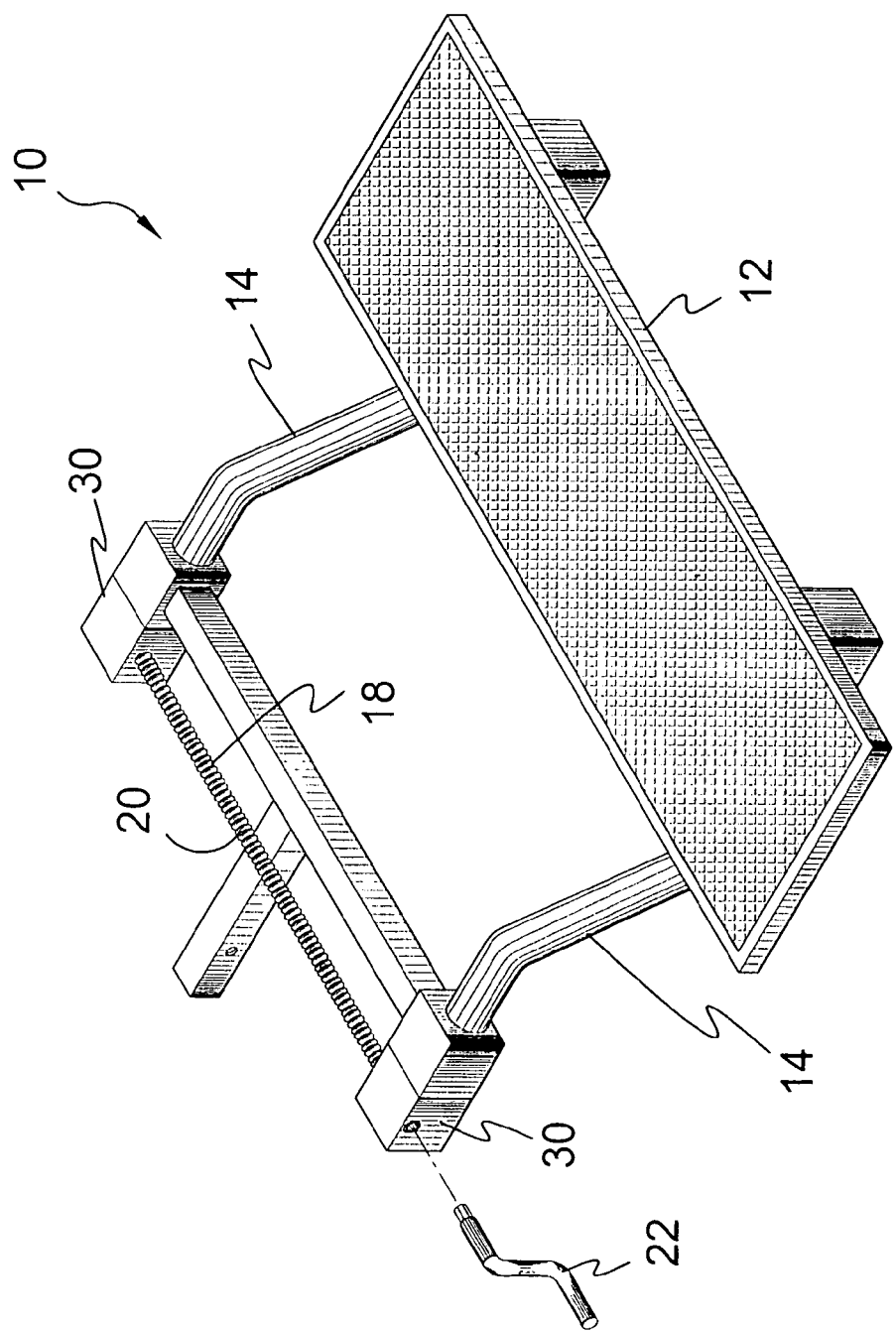
FIG. 2 is a perspective view of the present invention.

FIG. 2 is a perspective view of the present invention 10. A hand crank 22 or alternately a motor operable device connects to the primary worm gear 20 powering the system. There is a worm gear 30 on each arm bar lift 14 that is connected by a worm screw shaft 18. This delivers power to each arm bar 14 as it rotates from the load position to the travel position. The device can rotate 360 degrees keeping a level platform 12 through its entire rotation. This level platform 12 rotation can only be achieved by having both arm bars 14 connected and kept in time with each other with the worm gears 20,30 and worm screw shaft 18.

Figure 3:
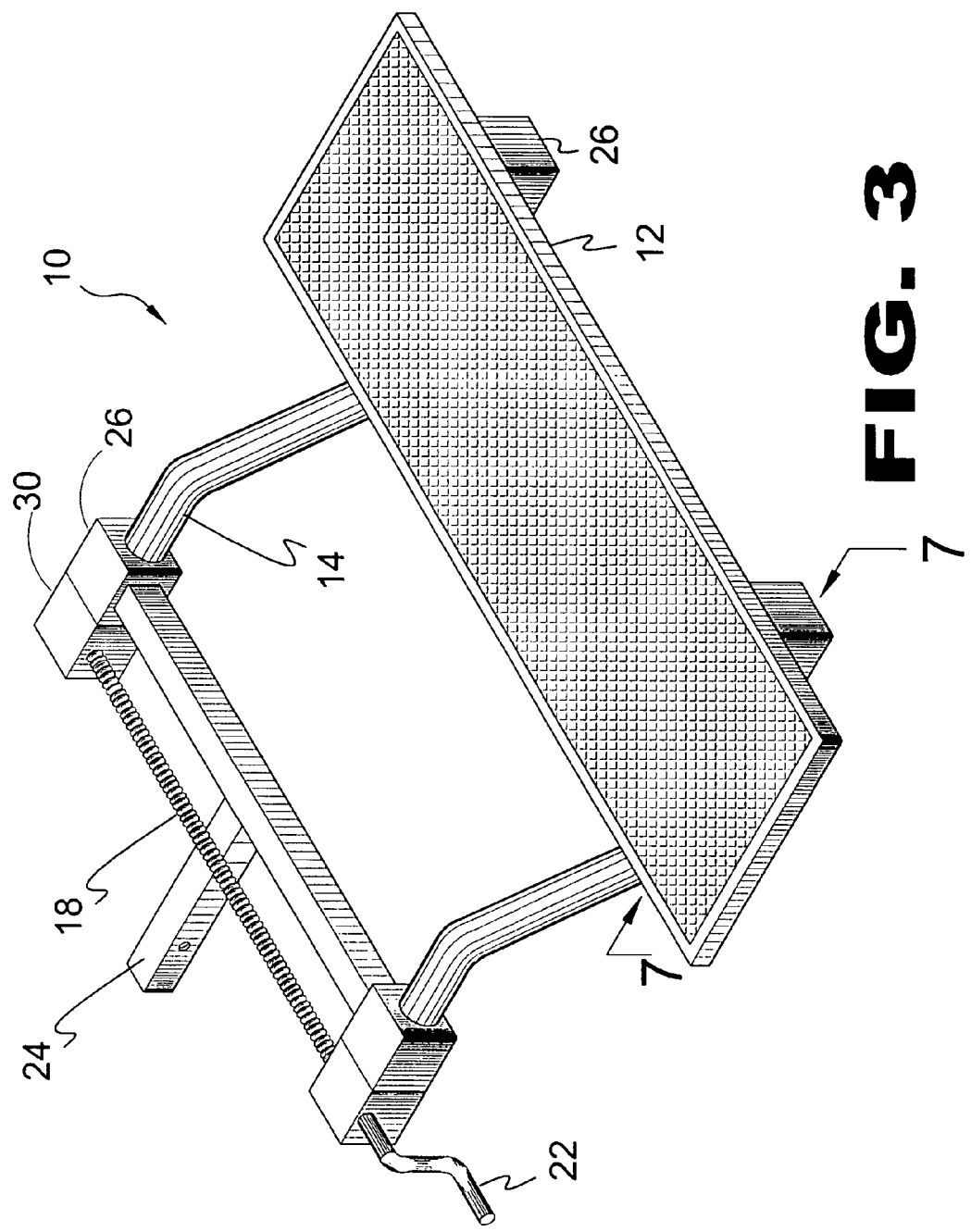
FIG. 3 is a perspective view of the present invention.
Figure 7:
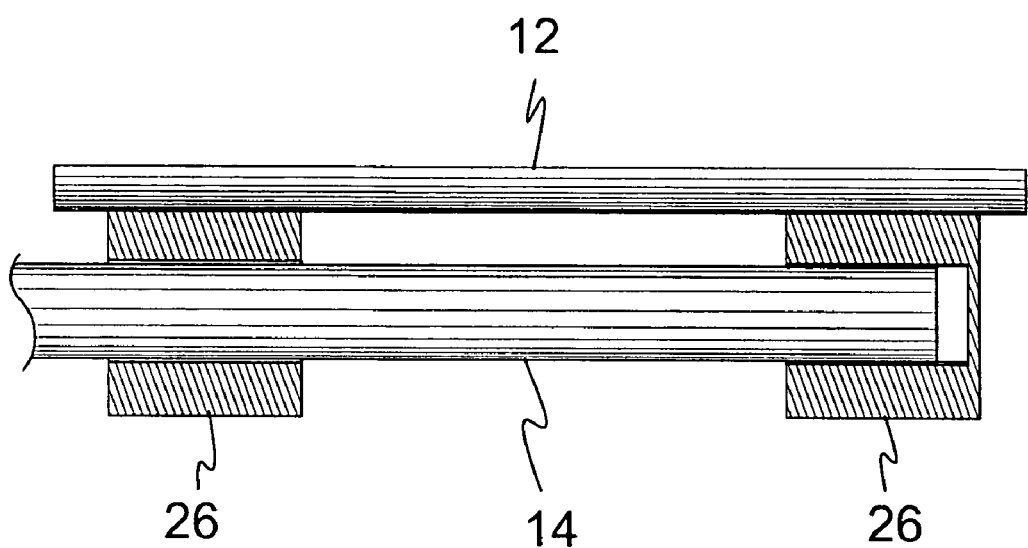
FIG. 7 is a sectional view of the present inventions lower platform and pillow block bearings.

FIG. 3 is a locator view of the present invention to assist in defining the sectional cut view on FIG. 7. As illustrated, hand crank 22 powers the system having a worm gear 30 on each arm bar lift 14 connected by worm screw shaft 18 which delivers power to each arm bar 14 as it rotates. The device can rotate 360 degrees keeping a level platform 12 through its rotation. This level platform 12 rotation can only be achieved by having both arm bars 14 connected and kept in time with each other with the worm gears 30 and worm screw shaft 18.

Figure 4:
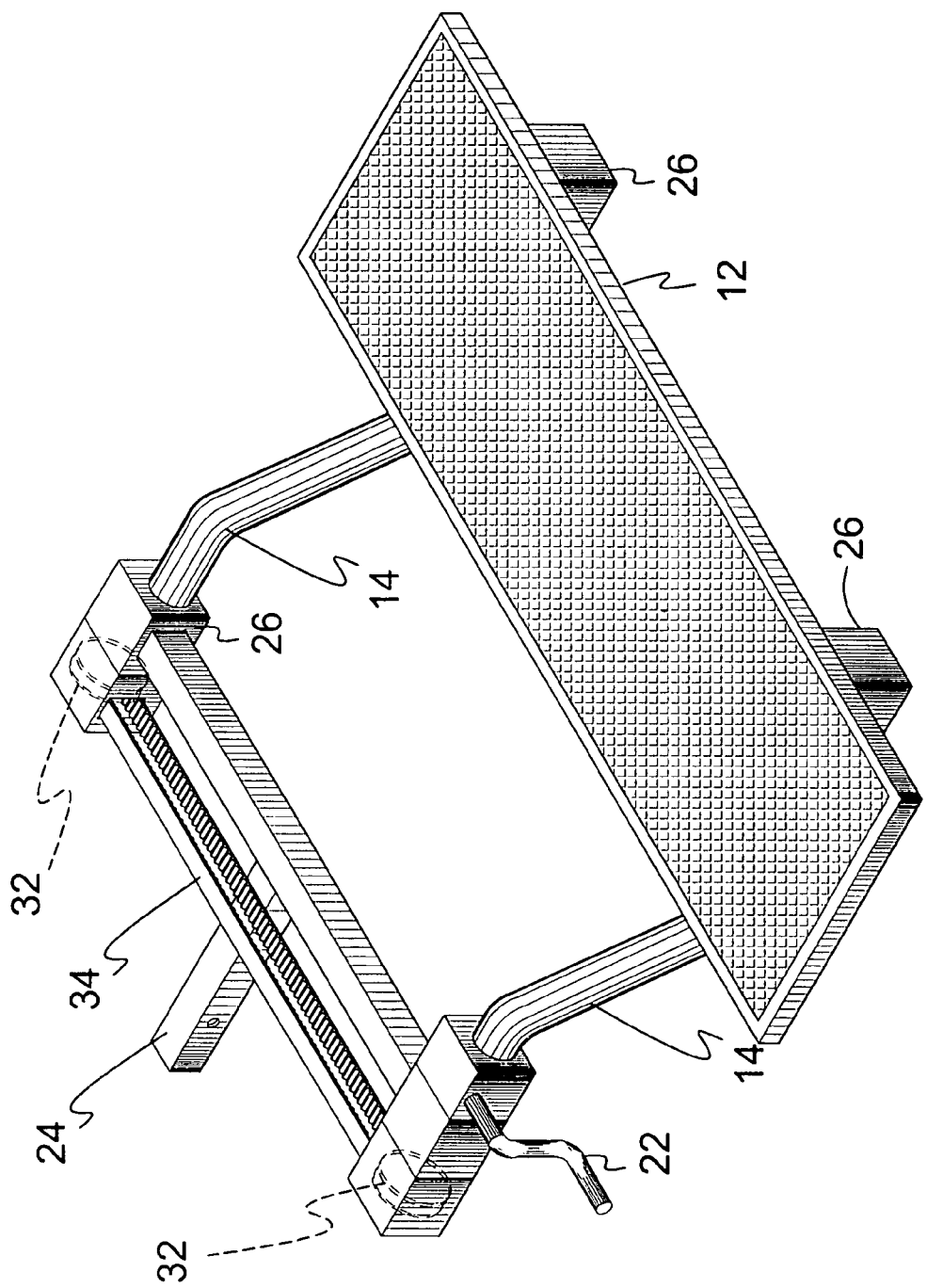
FIG. 4 is an alternate drive synchronization method of the present invention.

FIG. 4 is an alternate drive synchronization method of the present invention. Illustrated is a hand crank 22 connected to a timing wheel 32 and timing belt 34 as the system motive force. Each of the arm bar lift 14 is connected to a timing wheel 32 providing synchronization as each arm bar 14 rotates from the load position to the travel position. The device can rotate 360 degrees keeping a level platform 12 through its entire rotation. This level platform rotation can only be achieved by having both arm bars 14 connected and kept in time with each other with the timing wheels 32 and timing belt 34.

Figure 5:
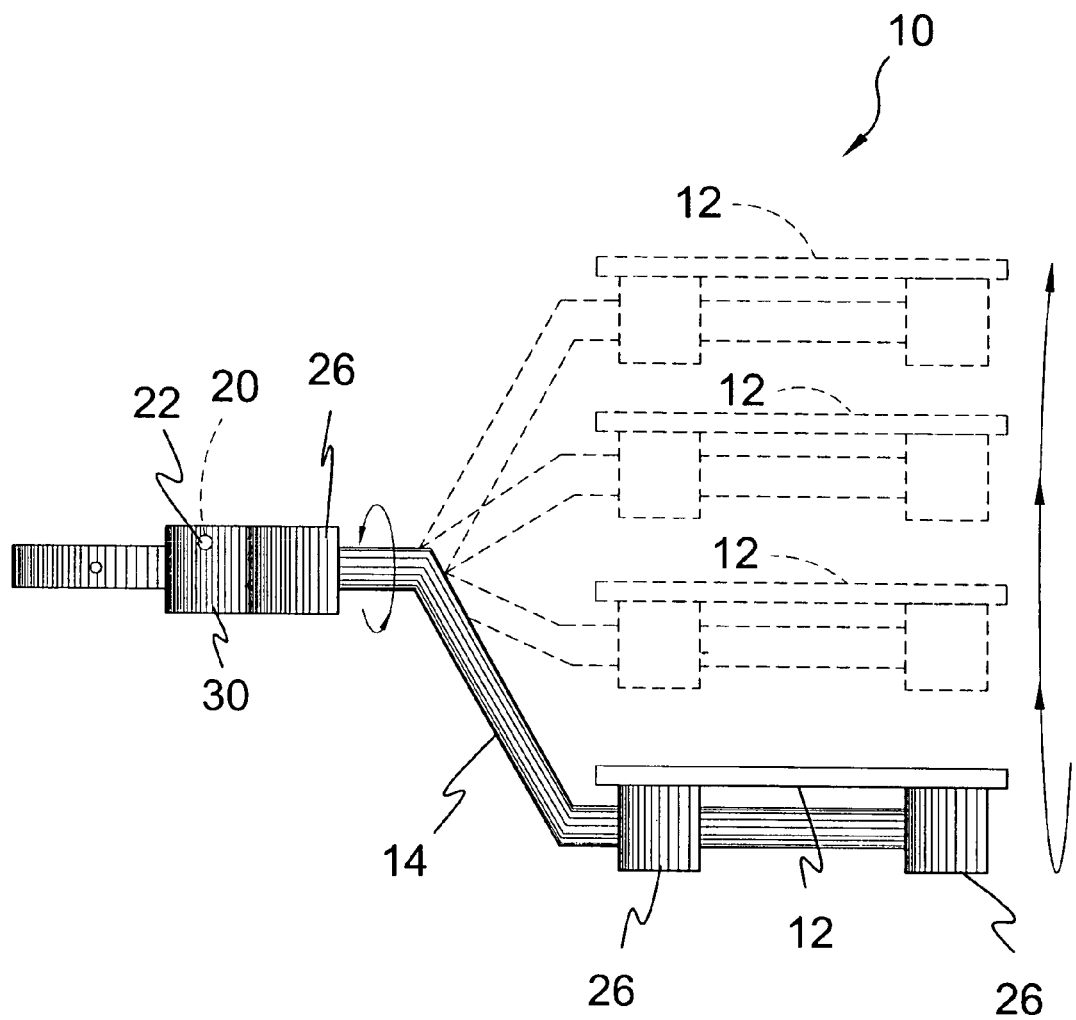
FIG. 5 is a side view of the present invention in an operative state.

FIG. 5 is a side view of the present invention 10 in the operative state. Shown is a side view of the present invention 10. The hand crank 22 or a motor operable device connects to the worm gear 20 powering the system. There is a worm gear 30 on each arm bar lift 14 that is connected by a worm screw shaft 18. This delivers power to each arm bar 14 as it rotates from the load position to the travel position. The device can rotate 360 degrees keeping a level platform 12 through its entire rotation. The pillow block bearings 26 allow the arm bars 14 to rotate freely therein during travel of the platform 12.

Figure 6:
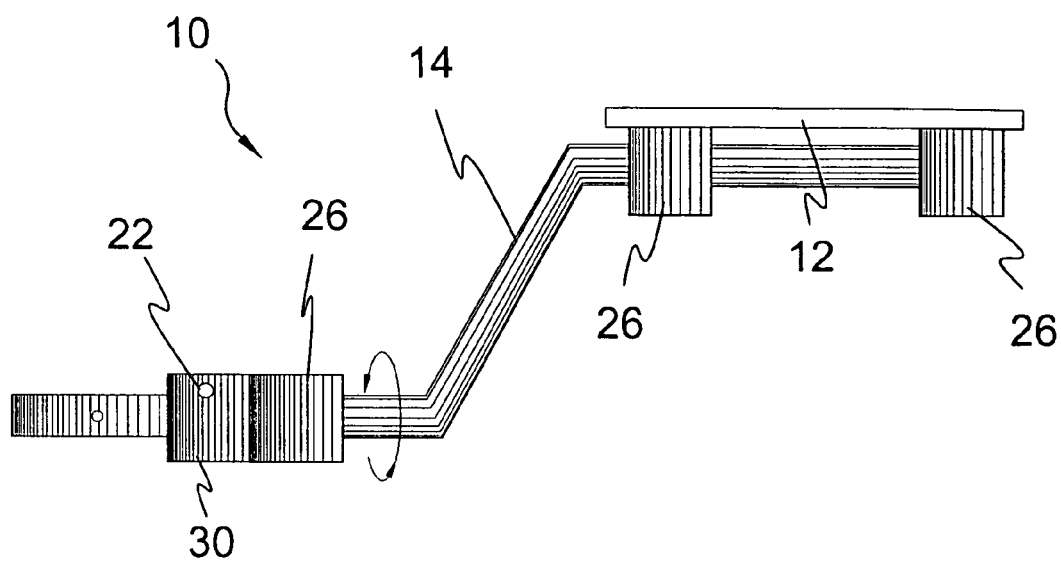
FIG. 6 is a side view of the present invention in a travel position.

FIG. 6 is a side view of the present invention 10 in the travel position. Shown is a side view of the present invention 10 with the lift platform 12 in the travel position. The hand crank 22 or a motor operable device connects to the worm gear 20 powering the system. There is a worm gear 30 on each arm bar lift 14 that is connected by a worm screw shaft 18. This delivers power to each arm bar 14 as it rotates from the load position to the travel position. The device can rotate 360 degrees keeping a level platform 12 through its entire rotation. The pillow block bearings 26 allow the arm bars 14 to rotate freely therein during travel of the platform 12.

FIG. 7 is a sectional view of the lift platform 12 and pillow block bearings 26. Pillow block bearings 26 are utilized to assist in the rotation of the platform 12 360 degrees keeping a level platform 12 through its entire rotation. This level platform 12 rotation can only be achieved by having both arm bars 14 connected and kept in time with each other with the worm gears and worm screw.

Figure 8:
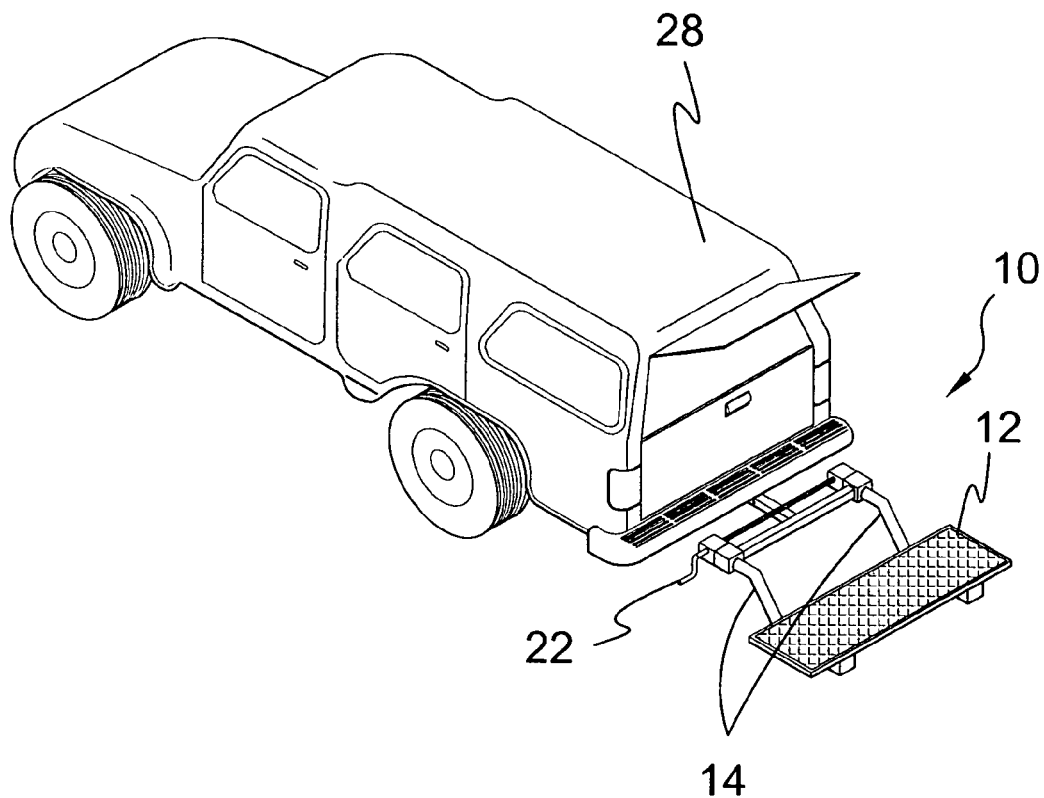
FIG. 8 is an illustrative view of the present invention in use.

FIG. 8 is an illustrative view of the present invention 10 in use with a motor vehicle 28. The present invention 10 is a lift apparatus incorporating gear means for rotating a horizontal platform 12 from a load position to a storage position while maintaining a horizontal state. The lift incorporates a drive mechanism operative via motor drive or hand powered crank 22 through a lifting task. The apparatus includes arms 14 positioned between the drive mechanism and the platform 12 that may be extendible.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A synchronized rotative lift apparatus for receiving a vehicle hitch comprising:
   a) a primary worm gear powering system comprising:
   a pair of worm gears connected by a worm screw shaft, first and second pillow block bearings, each of said first and second pillow block bearings being joined to a respective one of said worm gears, means for rotating said worm screw shaft;
   b) a first arm bar lift having a first end section projecting perpendicularly from said first pillow block bearing, a second arm bar lift having a first end section projecting perpendicularly from said second pillow block bearing, each arm bar lift having an angular midsection extending from its respective first end section at an obtuse angle, each arm bar lift having a second end section extending at an obtuse angle from its respective angular midsection parallel to its respective first end section;
   c) a lift platform for loading and unloading cargo for transport;
   d) a pair of pillow block bearings disposed on the underside of said lift platform, wherein each of said second end sections of said arm bar lifts extends into a respective one of said pair of pillow block bearings, each of said second end sections being rotatively disposed with respect to its respective pillow block bearing; and e) a receiver to provide means of attachment to the hitch of a vehicle;

f) wherein said lift platform maintains a substantially horizontal orientation throughout a 360 degree swing due to the second end sections of said arm bar lifts remaining on the same horizontal plane as they rotate within said pillow block bearings of said lift platform;

g) wherein said lift platform is moved between a lowered position and a raised position by rotating said worm screw shaft thereby synchronously rotating said worm gears and their respective arm bar lifts.

2. The lift apparatus as recited in claim 1, wherein said means for rotating said worm screw shaft is a handle crank.

3. The lift apparatus as recited in claim 1, wherein said means for rotating said worm screw shaft is a motor.

4. The lift apparatus as recited in claim 1, wherein said apparatus is removably installed onto the hitch of a motor vehicle and said lift platform is placed in the lowered position to facilitate loading.

* * * * *